(12) United States Patent
Kohda et al.

(10) Patent No.: US 8,755,450 B2
(45) Date of Patent: Jun. 17, 2014

(54) ADAPTATION TO MILLIMETER-WAVE COMMUNICATION LINK USING DIFFERENT FREQUENCY CARRIERS

(75) Inventors: Yasuteru Kohda, Kanagawa (JP); Daiju Nakano, Kanagawa (JP); Kohji Takano, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/479,887

(22) Filed: May 24, 2012

(65) Prior Publication Data

US 2012/0321005 A1 Dec. 20, 2012

(30) Foreign Application Priority Data

Jun. 16, 2011 (JP) ................................. 2011-134478

(51) Int. Cl.
*H04L 27/00* (2006.01)

(52) U.S. Cl.
USPC ........... 375/259; 375/260; 375/267; 375/299; 375/347; 375/349; 375/360

(58) Field of Classification Search
USPC .......... 375/259, 260, 267, 299, 347, 349, 360
See application file for complete search history.

(56) References Cited

U.S. PATENT DOCUMENTS

2004/0242177 A1* 12/2004 Yang ........................... 455/234.1
2010/0271991 A1* 10/2010 Kimura et al. ................ 370/310
2010/0309384 A1* 12/2010 Asjadi ........................... 348/725

FOREIGN PATENT DOCUMENTS

| JP | 8274758 A | 10/1996 |
| JP | 2003009253 A | 1/2003 |
| JP | 2009260993 A | 11/2009 |

* cited by examiner

*Primary Examiner* — Kabir A Timory
(74) *Attorney, Agent, or Firm* — Tutunjian & Bitetto, P.C.; Jeff Tang

(57) ABSTRACT

To realize quick adaptation to a communication link between a transmitter and a receiver by using two different frequency carriers. A receiver detects a preamble from a transmission bit string. When determining that a total sum of the number of modified bits exceeds a certain threshold in a range of a payload following the preamble (when detecting that a reception state of a communication link has been degraded), the receiver issues, to a transmitter, a request for changing a transmission parameter (four parameters may be used for enhancement/lowering) for the transmission bit string by using a communication link, which is a relatively-low-frequency carrier. On the other hand, the transmitter receives the request for change, and executes the request for changing the transmission parameter for the transmission bit string while maintaining transmission of a payload in the transmission bit string.

10 Claims, 6 Drawing Sheets

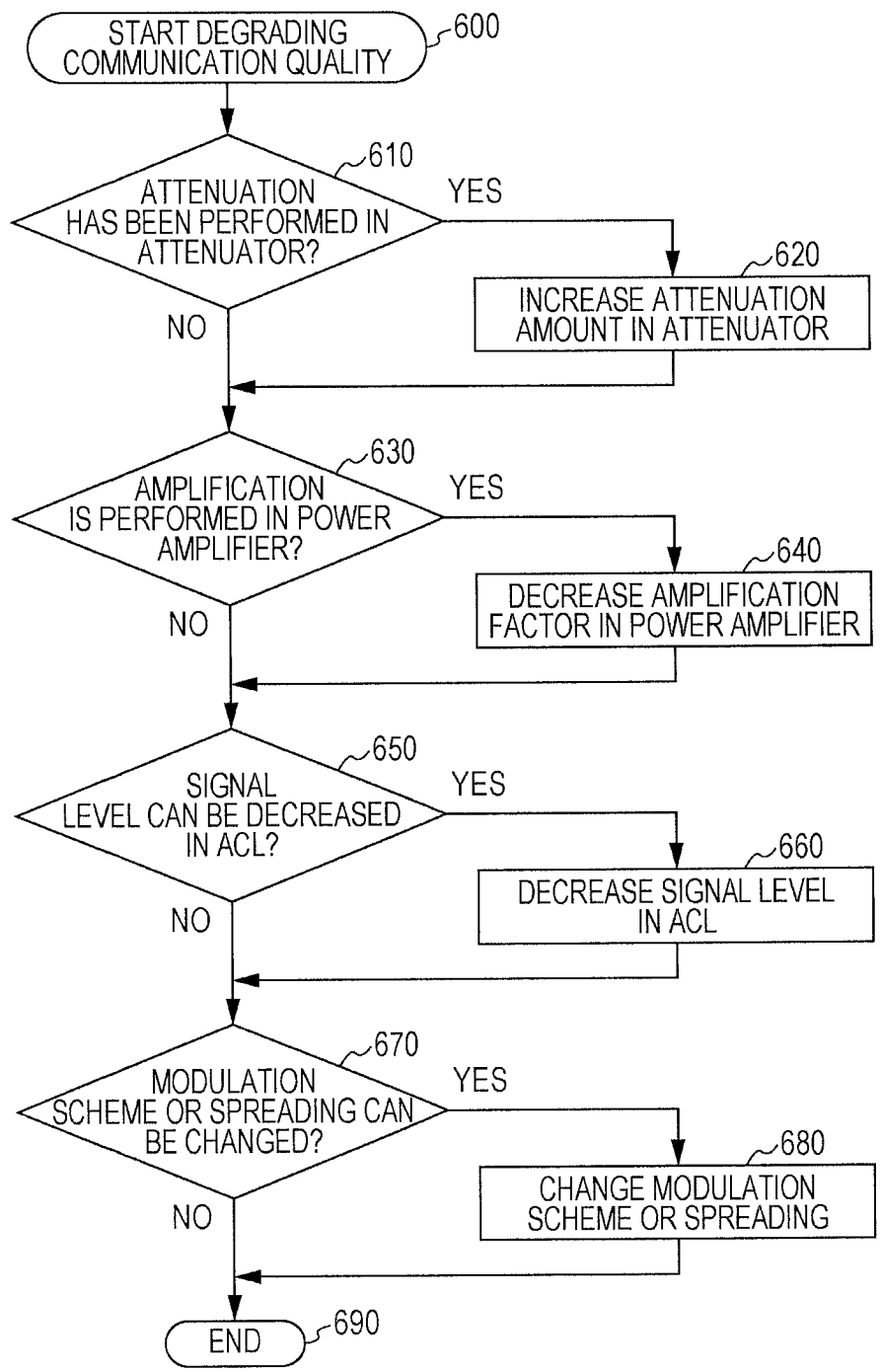

ADAPTATION TO MILLIMETER-WAVE COMMUNICATION LINK USING DIFFERENT FREQUENCY CARRIERS

TECHNICAL FIELD

The present invention relates to control of a radio communication link, and particularly relates to a technique of dynamically adapting to a state of a communication link using different frequency carriers.

BACKGROUND ART

A communication scheme in which millimeter waves in a 60 GHz band are used as a carrier for transmitting more information is attracting attention. Information is transmitted in units of frames. When the temporal lengths of frames are the same, more information is transmitted by using a high-frequency carrier than a low-frequency carrier.

In the case of transmitting information by using a high-frequency carrier, the amount of information transmitted per unit time is larger, and the influence of noise in a transmission path is larger than in the case of transmitting information by using a low-frequency carrier. If noise increases and degrades the state of a communication link, thereby causing difficulty in communication, the amount of information that is lost per unit time is very large.

Thus, it is desirable that the state of the communication link be detected on a receiver side, and the result of the detection be quickly fed back to a transmitter, thereby performing information transmission adapted to the state of the communication link. In the related art, however, information is transmitted/received by using only one certain carrier. Accordingly, the effect of the noise environment or the like may degrade the states of both links for transmission and reception. If a transmission-disabled state occurs in the communication link, then neither transmission nor reception of information can be performed.

Furthermore, in a frame constituted by a transmission bit string, it is not assumed that transmission thereof is stopped before completion. Even if the state of a link degrades during transmission of a frame, feedback for the state of the link can be performed only after transmission of the frame has been completed. Therefore, quick feedback cannot be performed.

Patent Literature 1 describes a typical method for transmitting/receiving one or plural packets, calculating an error rate for each packet, and requesting retransmission. In this method, however, communication quality cannot be improved during transmission of a long packet (jumbo frame) by dynamically changing a parameter, such as the power of a transmitter or an attenuation amount.

Patent Literature 2 relates to a system for transmitting two different pieces of information, initial information and additional information. In this system, the initial information is transmitted through a high-speed line, and the additional information is transmitted through a low-speed line. Here, the additional information may be a part of initial information that has not been transmitted correctly and needs to be retransmitted.

The system according to Patent Literature 2 is directed to decreasing the occupancy of a high-speed line by using a low-speed line to retransmit a non-urgent application. However, this system does not employ an approach of dynamically changing a parameter, such as the power of a transmitter or an attenuation amount, during transmission of a long packet (jumbo frame) to improve the state of the link, thereby improving communication quality.

Patent Literature 3 discloses a system for measuring an influence of a multipath and thereby changing a symbol rate or the level of multi-level modulation in a transmitter and a receiver using multiple-input multiple-output (MIMO). This system is configured under the assumption that the transmitter and the receiver face each other and are capable of performing equivalent communications.

Regarding determination of a symbol rate or the level of multi-level modulation, Patent Literature 3 describes a method in which a high symbol rate is used in an initial stage of communication and the symbol rate is decreased if the influence of the multipath is large. In addition, there is the following description: "The above process can be carried out prior to the start of communications. However, even during data communications, the bit error rate, the frame error rate, the packet error rate, and the retransmission request rate (retransmission rate) may be monitored, and the symbol rate may be lowered to make the numerical values of these rates sufficiently lower."

However, if the symbol rate of the transmitter changes, it is difficult for the receiver to quickly recognize the change in symbol rate and quickly adapt so as to normally perform reception at the new symbol rate. Patent Literature 3 does not describe improving communication quality during transmission of a long packet (jumbo frame) by dynamically changing a parameter, such as the power of the transmitter or an attenuation amount.

CITATION LIST

Patent Literature 1: Japanese Patent Application Publication No. 8-274758
Patent Literature 2: Japanese Patent Application Publication No. 2003-9253
Patent Literature 3: Japanese Patent Application Publication No. 2009-260993

SUMMARY

Accordingly, an object of the present invention is to realize quick adaptation to a communication link.

Quick adaptation to a communication link is realized by using two different frequency carriers.

Information about a link site of a high-frequency carrier is fed back at an appropriate timing, even during transmission of a frame using a high-frequency carrier, by using a low-frequency carrier provided in parallel with the high-frequency carrier.

While a data frame having a long payload (jumbo frame) of millimeter waves is being transmitted, information about the state of a communication link is fed back (to a transmitter side) using another channel, so as to perform control.

In the feedback control, it is determined whether or not the total sum of the number of modified bits in a payload exceeds a certain threshold.

In the feedback control, a request for changing a transmission parameter (regarding RF of a transmitter and transmission in a baseband) of a transmission bit string is issued.

Examples of the transmission parameter used for the feedback control include parameters the change of which has an influence on a frame (transmission bit string) that is currently being transmitted or frames subsequent to the frame that is currently being transmitted.

Examples of the transmission parameter that can be changed even during transmission of a frame (transmission bit string) include an amplification factor in a power amplifier of RF, an attenuation amount in an attenuator, and a signal level in a baseband ALC.

Examples of the transmission parameter that should be changed for the subsequent frames (transmission bit strings) include modulation of a baseband and spreading.

According to the present invention, quick adaptation to a communication link can be realized.

BRIEF DESCRIPTION OF DRAWINGS

FIG. 6 is a diagram illustrating a flowchart of a process for degrading communication quality on the transmitter side.

DESCRIPTION OF EMBODIMENTS

In the following description, millimeter waves of 60 GHz are used as a high-frequency carrier, and Wi-Fi of 2.4 GHz/5 GHz is used as a low-frequency carrier (relatively-low-frequency carrier), which are specific examples of two different frequency carriers. Note that, however, the scope of the technical spirit of the present invention is not limited to such a specific combination of millimeter waves and Wi-Fi, and to a specific frequency (band).

Figure 1:
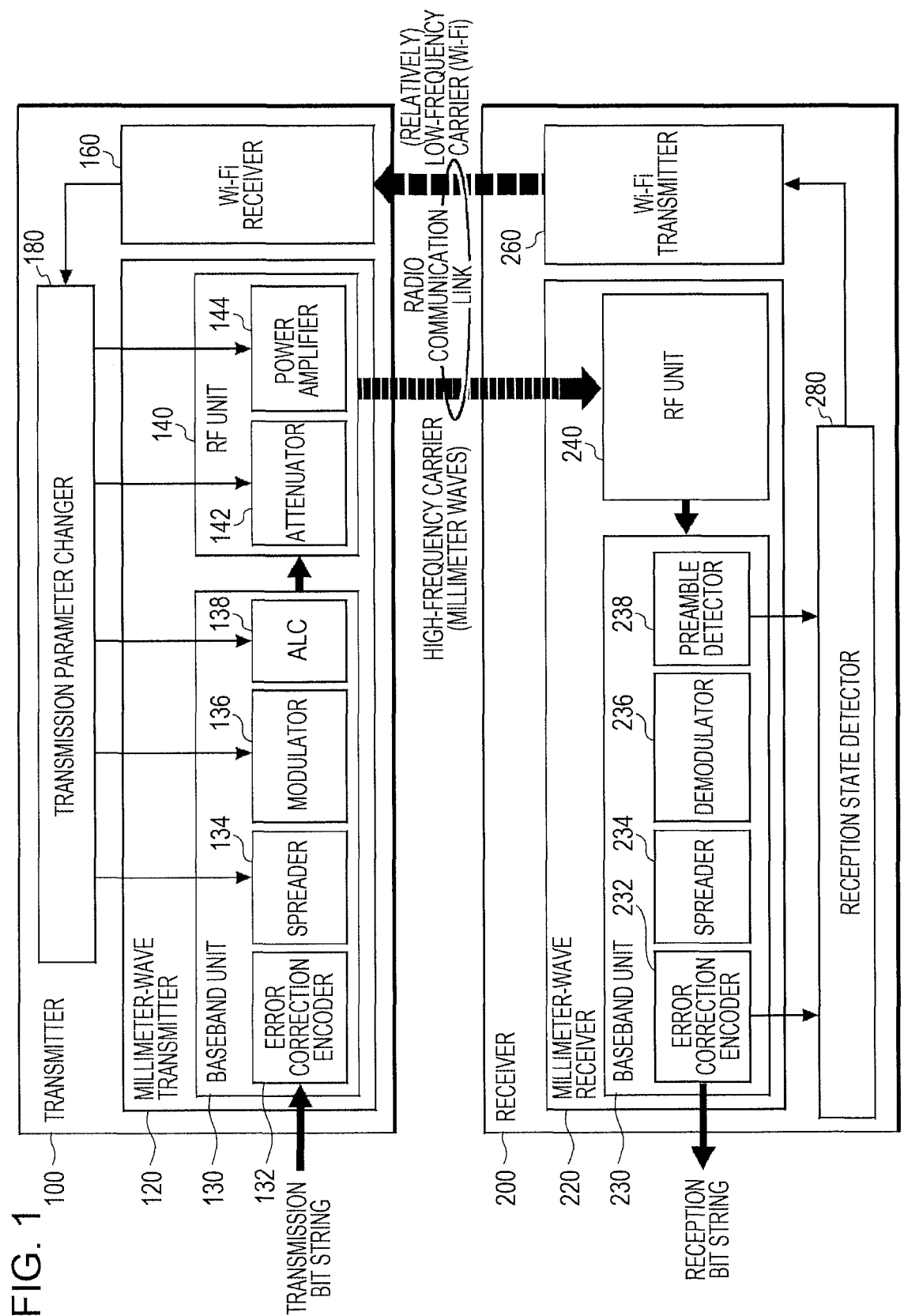
FIG. 1 is a diagram illustrating an entire configuration including a receiver and a transmitter to which the present invention is applied.

FIG. 1 is a diagram illustrating an entire configuration including a receiver and a transmitter to which the present invention is applied.

A transmission bit string to be transmitted is input to a transmitter 100. The transmitter 100 includes three functional blocks, that is, a millimeter-wave transmitter 120 for transmitting a bit string using millimeter waves, a Wi-Fi receiver 160 for receiving information about a link via Wi-Fi, which is a feature of the present invention, and a transmission parameter changer 180.

The millimeter-wave transmitter 120 includes a baseband unit 130 for performing digital signal processing on a transmission bit string, and a radio frequency (RF) unit 140 for actually transmitting, using millimeter waves, the transmission bit string processed by the baseband unit 130.

The functions of the baseband unit 130 are constituted by an error correction encoder 132, a spreader 134 for spreading transmission bits to increase robustness, a modulator 136 for performing modulation of transmission, and an automatic level controller (ALC) 138 for adjusting an output level of transmission.

The RF unit 140 has functions including an attenuator 142 for adjusting the level of an output from the baseband unit 130, and a power amplifier 144 serving as an amplifying circuit.

The transmission parameter changer 180 controls parameters used for signal processing performed in the baseband unit 130 and the RF unit 140, and adjusts a signal that is to be actually transmitted by the RF unit 140.

On the other hand, the receiver 200 also includes three functional blocks. One is a millimeter-wave receiver 220, which receives information transmitted over millimeter waves by using an RF unit 240 for receiving millimeter waves, and which extracts a transmitted bit string as a reception bit string from the information by using a baseband unit 230. Another is a Wi-Fi transmitter 260, which transmits, via Wi-Fi, information about the state of a link detected by a reception state detector 280 (described below). The other is the reception state detector 280, which detects the state of a link on the basis of information obtained as a result of reception in the baseband unit 230, and transmits the information via Wi-Fi.

The baseband unit 230 includes a preamble detector 238 for detecting a preamble, which is a head portion of a frame transmitted using millimeter waves, and an error correction decoder 232 for decoding an error correction code of a received data string. The baseband unit 230 also includes a spreader 234 and a demodulator 236.

Figure 2:
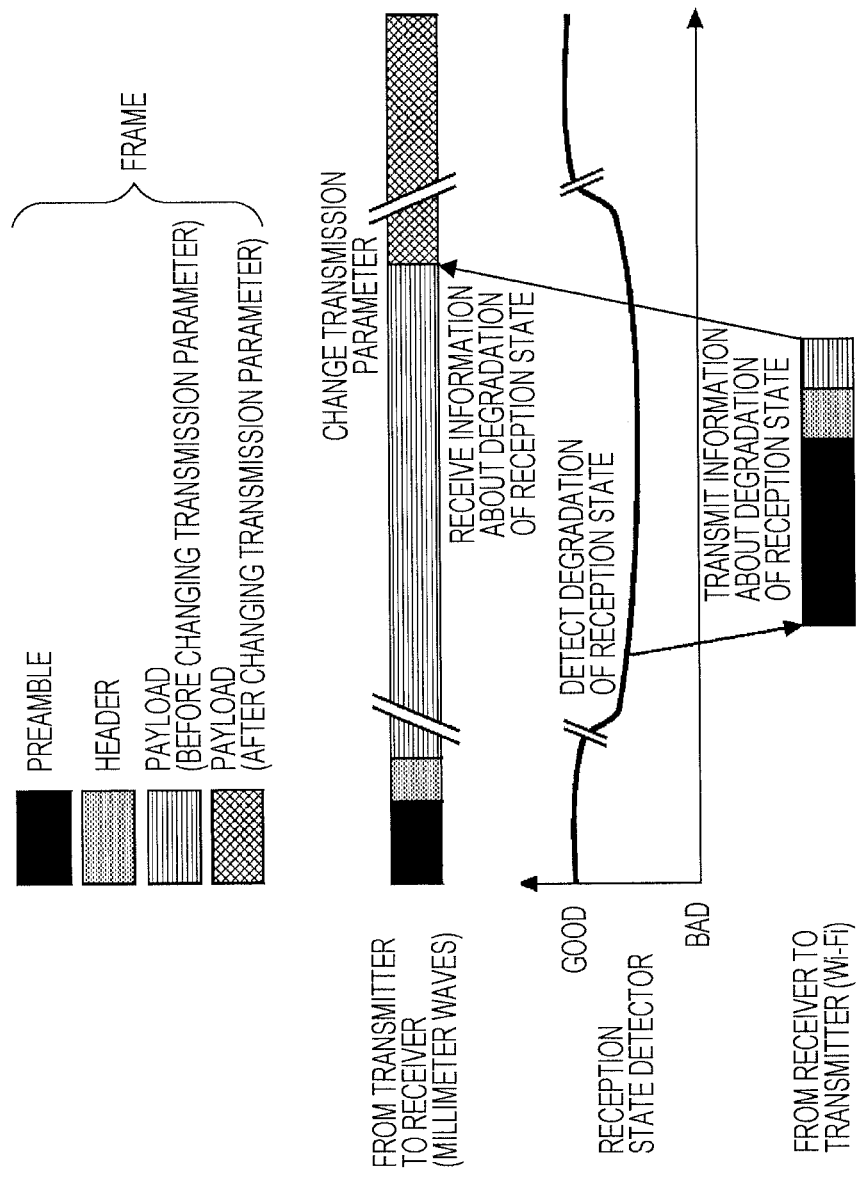
FIG. 2 is a schematic diagram illustrating a state where a Wi-Fi transmitter transmits information about a change in reception state when a reception state detector of the receiver detects that the state of a communication link has changed while information is being transferred using millimeter waves.

FIG. 2 is a schematic diagram illustrating a state where the Wi-Fi transmitter 260 transmits information about a change in reception state when the reception state detector 280 of the receiver 200 detects that the state of a communication link has changed while information is being transferred using millimeter waves.

In FIG. 2, the horizontal axis indicates time. The bar on the right of "from transmitter to receiver (millimeter waves)" represents a frame transmitted using millimeter waves, and represents a state where transmission bits are output from the transmitter 100. The frame is constituted by a preamble, a header, and a payload.

The graph in FIG. 2 indicates the state of the link observed by the reception state detector 208 of the receiver 200. The vertical axis indicates the state of the communication link. In the example illustrated in FIG. 2, a state is assumed in which the state of the link of millimeter waves degrades as time progresses. When degradation of the state of the communication link is detected, the receiver 200 transmits information about the degradation to the transmitter 100 using Wi-Fi.

Detection of degradation of the state of the communication link can be performed by obtaining a total sum of the number of modified bits and determining whether or not the total sum exceeds a certain threshold. The details of the procedure of this process will be described below.

The bar on the right of "from receiver to transmitter (Wi-Fi)" at the bottom of FIG. 2 represents a frame regarding the state of the communication link transmitted using Wi-Fi. As indicated in the latter portion of the frame illustrated above the graph, a transmission parameter of the transmitter 100 is dynamically changed after receiving information about the link state. In this way, even when transmission is currently being performed using millimeter waves, a transmission parameter can be dynamically changed in accordance with the link state that changes during transfer of a frame using millimeter waves, by transmitting information about the state of the communication link of millimeter waves via Wi-Fi.

Figure 3:
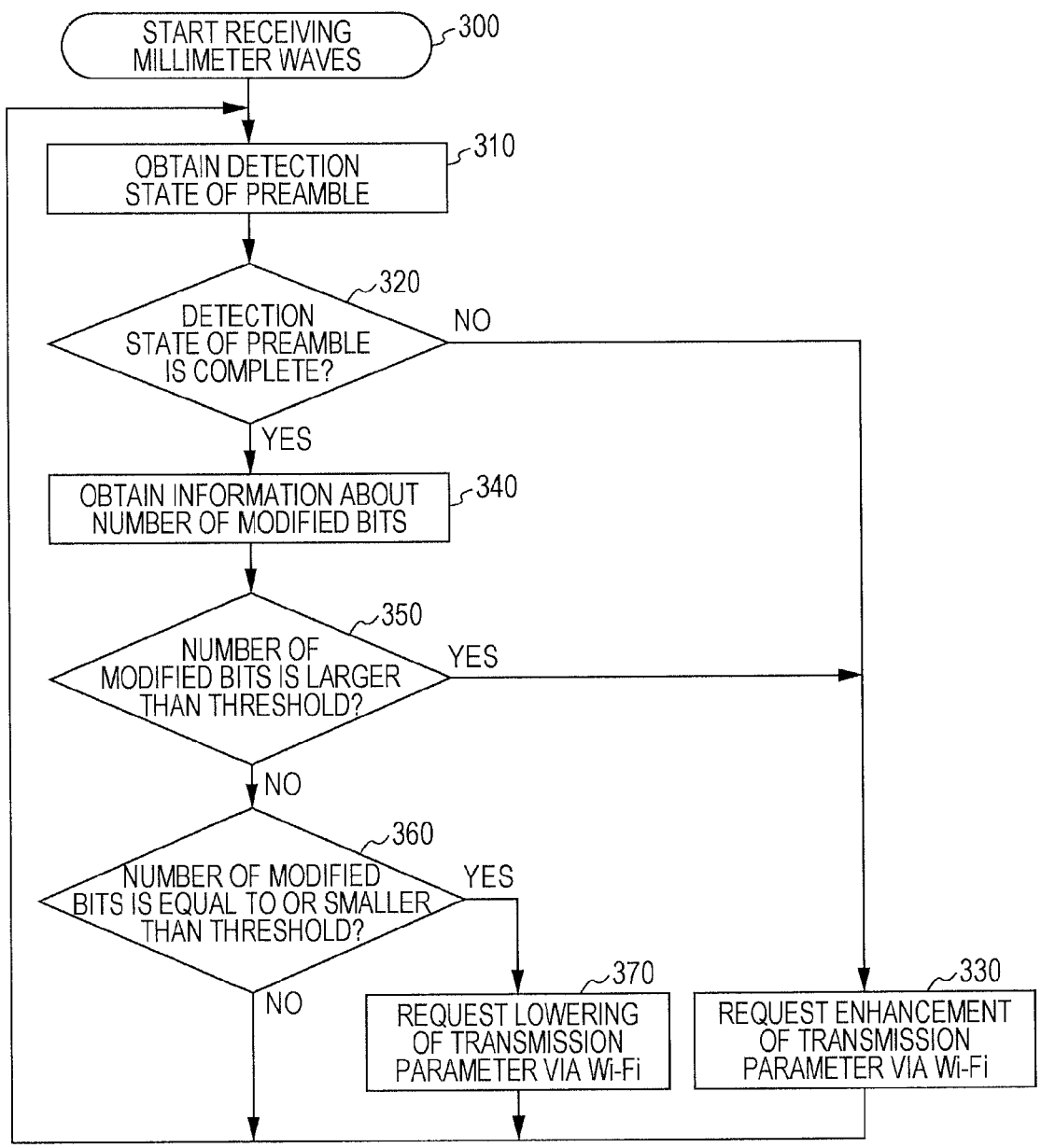
FIG. 3 is a diagram illustrating a flowchart of a method for detecting a state of a communication link in the reception state detector of the receiver.

FIG. 3 is a diagram illustrating a flowchart of a method for detecting a state of a communication link in the reception state detector 280 of the receiver 200.

The baseband unit 230 included in the millimeter-wave receiver 220 of the receiver 200 includes the preamble detector 238 for detecting a preamble, which is a head portion of a frame transmitted using millimeter waves, and the error correction decoder 232 for decoding an error correction code of a received data string (FIG. 1).

In the preamble detector 238, the degree of similarity between received information and a preamble is calculated to determine whether or not a preamble is wirelessly transmitted. The degree of similarity can be obtained as information in the form of a numerical value. With this numerical value, it can be determined whether a preamble has been completely detected, or incompletely detected on the basis of the estimation that the received information is likely to be a preamble.

Reception of millimeter waves is started in step 300, and a detection state of a preamble is obtained in step 310.

In step 320, it is determined whether or not a preamble has been completely detected. If the preamble has been completely detected, it can be determined that the link of millimeter waves is in a sufficiently favorable state. If the preamble has been incompletely detected on the basis of the estimation that received information is likely to be a preamble, it is determined that the state of the link is unfavorable. Specifically, a threshold is provided for a numerical value output from the preamble detector 238, and whether a preamble has been completely detected or incompletely detected is determined.

If the preamble has been incompletely detected, it is determined that the state of the link is unfavorable. Thus, in step 330, the transmitter 100 is notified that the state of the link is degraded, and an enhancement request for enhancing a transmission parameter is issued to the transmitter 100 via Wi-Fi. Here, the enhancement request specifically means a request for increasing the amplitude of millimeter waves used for transmission, and increasing a spreading ratio of information bits by changing modulation or spreading.

With the detected preamble serving as a start point, the following process can be performed within the range of a payload following the detected preamble.

A received data string is protected by an error correction code. If an error in transmission is correctable, the error is corrected by the error correction decoder 232, and at the same time, information indicating the number of bits of the corrected error can be obtained in step 340.

In step 350, if the total sum of the number of modified bits exceeds (is larger than) a certain threshold, it is determined that the state of the communication link is unfavorable (or is degrading as time progresses), and an enhancement request for enhancing a transmission parameter due to degradation of the state of the communication link is issued to the transmitter 100 via Wi-Fi in step 330.

In step 360, if the total sum of the number of modified bits does not exceed (is equal to or smaller than) the threshold, it is determined that the state of the communication link is sufficiently favorable (or is improving as time progresses). If the state of the communication link is sufficiently favorable, control can be performed by changing a parameter on the transmitter 100 side, for example, by decreasing the output level of transmission, so as to prevent wastefully large output.

If it is determined in step 360 that the total sum of the number of modified bits does not exceed the threshold, it is determined that the state of the communication link is sufficiently favorable, and a lowering request for lowering a transmission parameter is issued to the transmitter 100 via Wi-Fi in step 370. Here, the lowering request specifically means a request for decreasing the amplitude of millimeter waves used for transmission, and decreasing a spreading ratio of information bits by changing modulation or spreading.

An attenuation amount in the attenuator 142, an amplification factor in the power amplifier 144, and a signal level in the ALC 138 are parameters that can be changed during transmission of a frame using millimeter waves.

On the other hand, modulation and spreading are parameters that are set at the start point of a frame and that need to be constant in the entire frame, and thus are unchangeable during transmission of the frame. However, by applying the method according to the present invention, new parameters of modulation and spreading can be applied after the current frame has been transmitted, and the subsequent frames can be transmitted using the new parameters of modulation and spreading.

In an actual system configuration, both or any one of the lowering request and the enhancement request may be performed.

Figure 4:
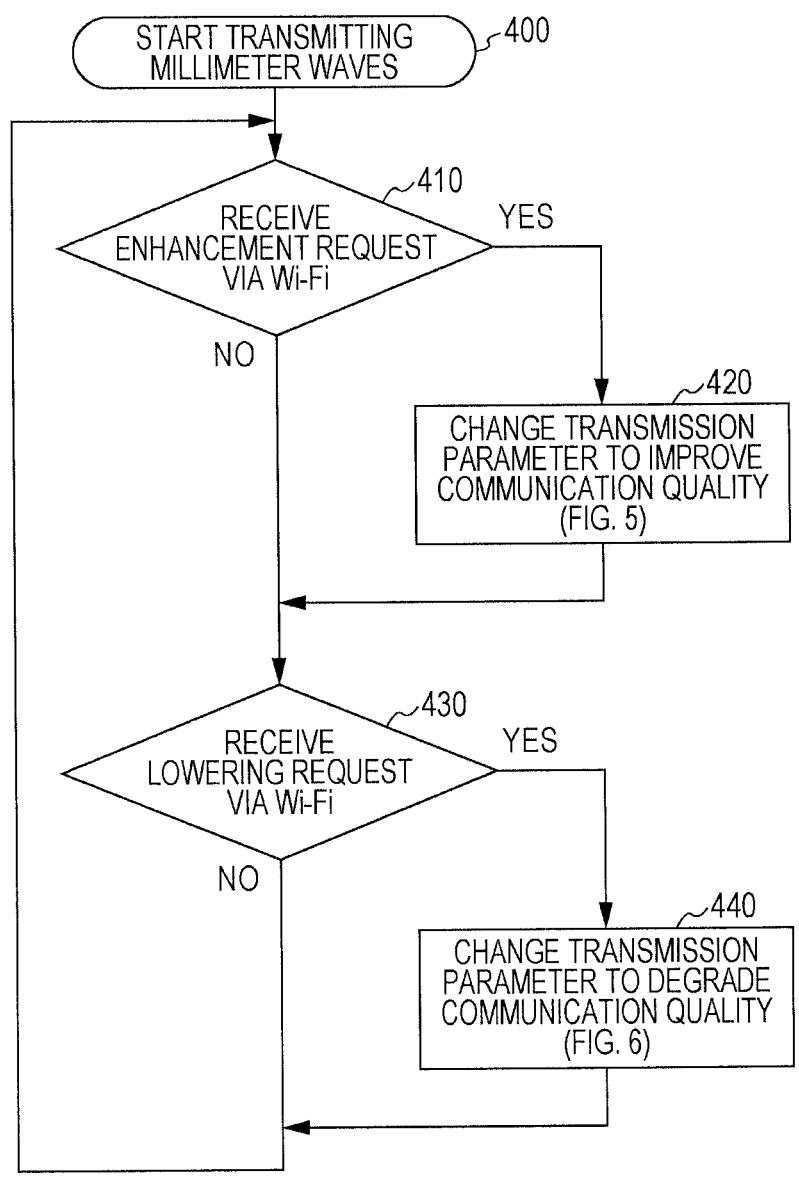
FIG. 4 is a diagram illustrating a flowchart of a process performed in a transmission parameter changer of the transmitter.

FIG. 4 is a diagram illustrating a flowchart of a process performed in the transmission parameter changer 180 of the transmitter 100.

After transmission of millimeter waves starts in step 400, a transmission parameter is changed in accordance with information about the link state observed on the reception side, the information being transmitted via Wi-Fi. Specifically, if an enhancement request is issued via Wi-Fi in step 410 due to degradation of the link state, the transmission parameter is changed to improve communication quality in step 420. If a lowering request is issued via Wi-Fi in step 430 due to a favorable link state, the transmission parameter is changed to degrade communication quality in step 440.

Figure 5:
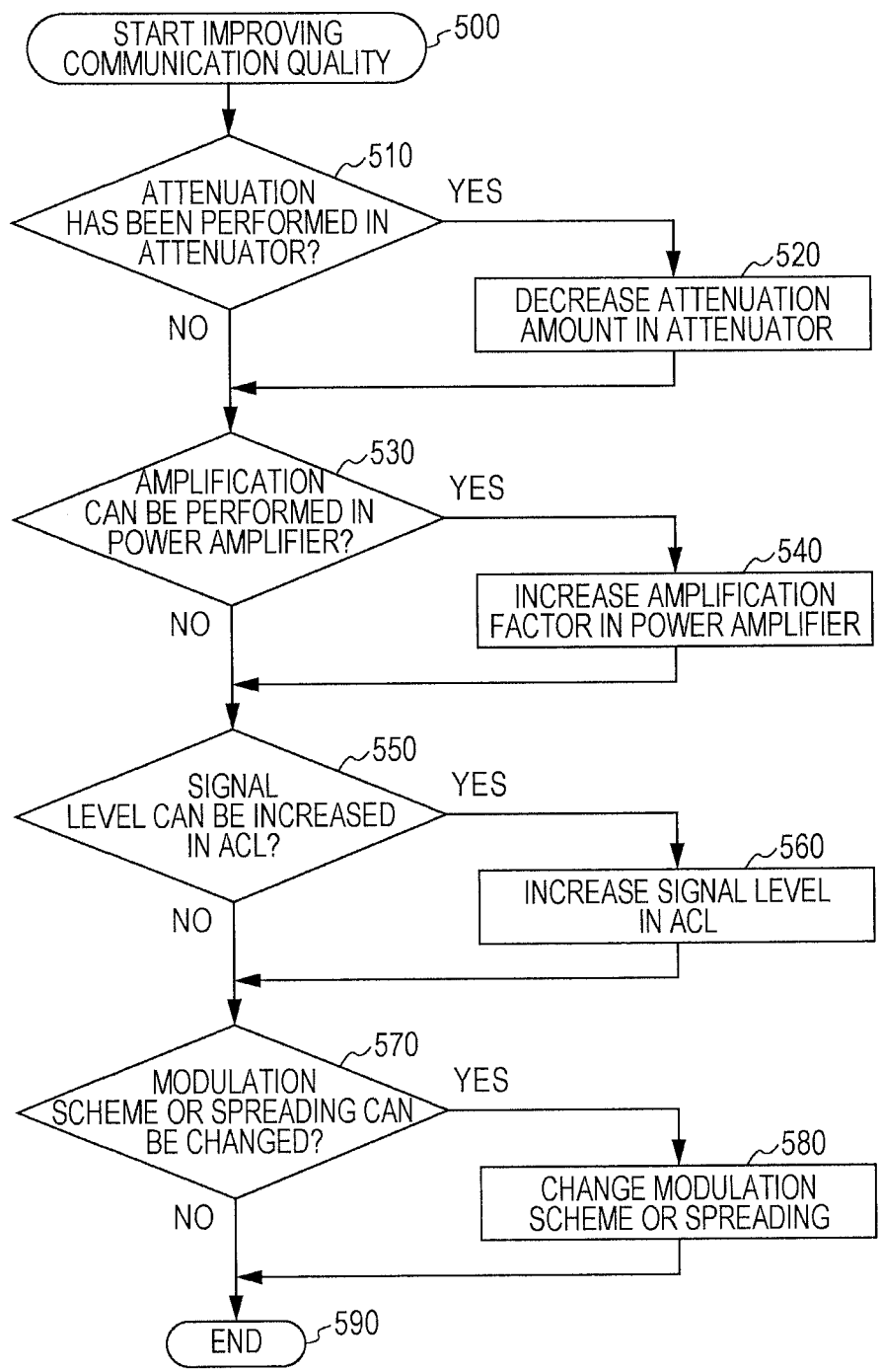
FIG. 5 is a diagram illustrating a flowchart of a process for improving communication quality on the transmitter side.

FIG. 5 is a diagram illustrating a flowchart of a process for improving communication quality on the transmitter 100 side.

In the example illustrated in FIG. 5, four transmission parameters are used. Note that not all the four parameters are essential, and only one or some of the parameters may be used.

In the example illustrated in FIG. 5, an attenuation amount in the attenuator 142, an amplification factor in the power amplifier 144, a signal level in the ALC 138, and modulation/spreading are used as transmission parameters. When an enhancement request is received, the state of a link is degraded, and thus one or more of the parameters are changed to enhance the output of millimeter waves. If attenuation has been performed by the attenuator 142, the attenuation amount is decreased to enhance the signal. If attenuation has not yet been performed by the attenuator 142, the next parameter, that is, the amplification factor in the power amplifier 144, is changed. If amplification can be performed, amplification is performed. If the amplification factor has already reached the maximum, the level of the ALC 138 is increased. If the level of the ALC 138 has already reached the maximum, another parameter such as the modulation scheme or spreading is changed.

FIG. 6 is a diagram illustrating a flowchart of a process for degrading communication quality on the transmitter 100 side.

When a lowering request is received, a process opposite to the process that is performed when receiving an enhancement request is performed. Control is performed to decrease the output of millimeter waves by changing one or more of the transmission parameters.

The method according to the present invention can be executed in the configuration of a receiver or a transmitter or a combination thereof. Alternatively, the method according to the present invention can be carried out as a program executed by a single or plural computers.

The invention claimed is:

1. A method for issuing, in a receiver, a request for changing a transmission parameter for a transmission bit string to a transmitter to adapt to a state of one communication link, the method comprising:
   receiving a transmission bit string from the transmitter;
   detecting a preamble from the transmission bit string;
   obtaining a total sum of a number of modified bits in a range of a payload following the detected preamble;
   determining whether or not the total sum of the number of modified bits exceeds a threshold; and
   issuing, if it is determined that the total sum of the number of modified bits exceeds the threshold, a request for changing the transmission parameter for the transmission bit string to the transmitter, using a communication link provided in parallel with the one communication link and serving as a relatively-low-frequency carrier.

2. The method according to claim 1, further comprising:
   receiving the request for changing the transmission parameter for the transmission bit string from the receiver; and
   executing the request for changing the transmission parameter for the transmission bit string while maintaining transmission of the payload in the transmission bit string to the receiver,
   the step of receiving the request and the step of executing being executed in the transmitter after the steps according to claim 1 have been performed.

3. The method according to claim 1, wherein the request for changing the transmission parameter for the transmission bit string is a request for enhancing the transmission parameter.

4. The method according to claim 1, wherein the request for changing the transmission parameter for the transmission bit string is a request for lowering the transmission parameter.

5. The method according to claim 1, wherein the number of modified bits includes the number of bits of error corrected in decoding.

6. A non-transitory computer readable storage medium and comprising a computer readable program for issuing, in a receiver, a request for changing a transmission parameter for a transmission bit string to a transmitter to adapt to a state of one communication link, wherein the computer readable program when executed on the receiver causes the receiver to execute:
   a step of receiving a transmission bit string from the transmitter;
   a step of detecting a preamble from the transmission bit string;
   a step of obtaining a total sum of a number of modified bits in a range of a payload following the detected preamble, the number of modified bits including the number of bits of error corrected in decoding;
   a step of determining whether or not the total sum of the number of modified bits exceeds a threshold; and
   a step of issuing, if it is determined that the total sum of the number of modified bits exceeds the threshold, a request for changing the transmission parameter for the transmission bit string to the transmitter, using a communication link provided in parallel with the one communication link and serving as a relatively-low-frequency carrier.

7. The computer readable storage medium according to claim 6, further comprising:
   a step of receiving the request for changing the transmission parameter for the transmission bit string from the receiver; and
   a step of executing the request for changing the transmission parameter for the transmission bit string while maintaining transmission of the payload in the transmission bit string to the receiver,
   the step of receiving the request and the step of executing being executed after the steps according to claim 6 have been performed.

8. The computer readable storage medium according to claim 6, wherein the request for changing the transmission parameter for the transmission bit string is a request for enhancing the transmission parameter.

9. The computer readable storage medium according to claim 6, wherein the request for changing the transmission parameter for the transmission bit string is a request for lowering the transmission parameter.

10. The computer readable storage medium according to claim 6, wherein the number of modified bits includes the number of bits of error corrected in decoding.

* * * * *